June 16, 1925.                            1,541,856
E. SANDS
TRAP
Filed Jan. 22, 1924

WITNESSES                                  INVENTOR
                                           ERNEST SANDS,
                                       BY
                                           ATTORNEYS

Patented June 16, 1925.

1,541,856

UNITED STATES PATENT OFFICE.

ERNEST SANDS, OF CHARLESTON, SOUTH CAROLINA.

TRAP.

Application filed January 22, 1924. Serial No. 687,801.

*To all whom it may concern:*

Be it known that I, ERNEST SANDS, a citizen of Hungary, residing at Charleston, in the county of Charleston, State of South Carolina, have invented certain new and useful Improvements in Traps, of which the following is a specification.

My invention relates to improvements in traps which are especially adapted for use in connection with small animals, such as rats, mice, and the like, and it consists in the combinations, constructions and arrangements herein described and claimed.

More particularly, the present invention is an improvement over the trap disclosed in my prior application for Letters Patent of the United States, Serial No. 679,143, filed Dec. 7, 1923.

In my aforesaid prior application, I disclose a trap having a spring-pressed jaw of novel construction mounted on a base, the jaw being provided with a pair of laterally extending grip or handle portions, whereby the jaw may be manually swung to "set" position without causing the hands of the operator to be soiled, the jaw being adapted to co-operate with a pivoted combined jaw-retaining and trigger member which is mounted on the base and which may be releasably held in position to cause the jaw to be set by co-operative bait-carrying and weighted lever members which also are mounted on the base.

An object of the present invention is to improve the construction of the means comprised in a trap of the character described for releasably holding the spring-pressed jaw in "set" position.

A further object of the invention is to simplify the construction of the means comprised in a trap of the character described for holding the jaw in "set" position so that but relatively few parts will be comprised in the device and the possibility that the device may get out of order in service, therefore, is lessened.

Other objects and advantages will be apparent from the following description, considered in conjunction with the accompanying drawings, in which:—

Figure 1:
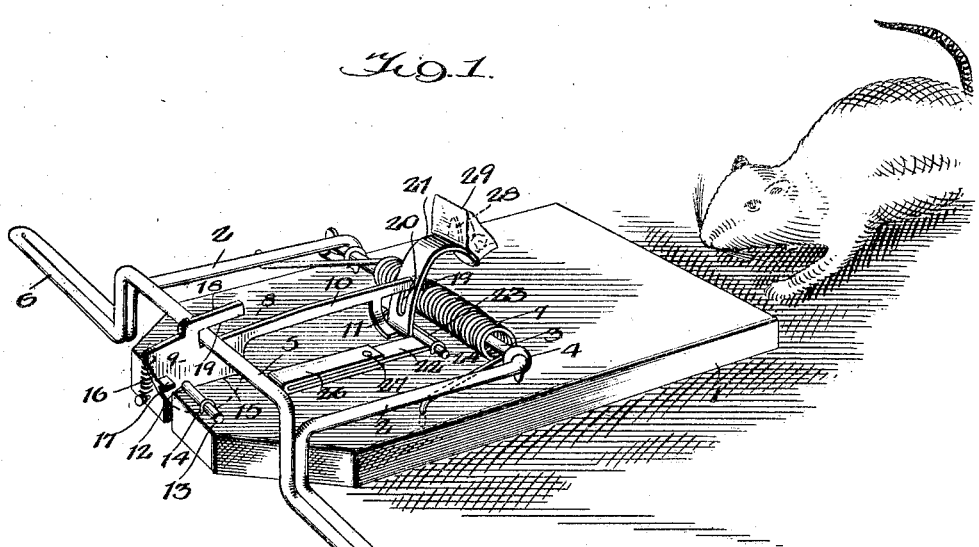
Figure 2:
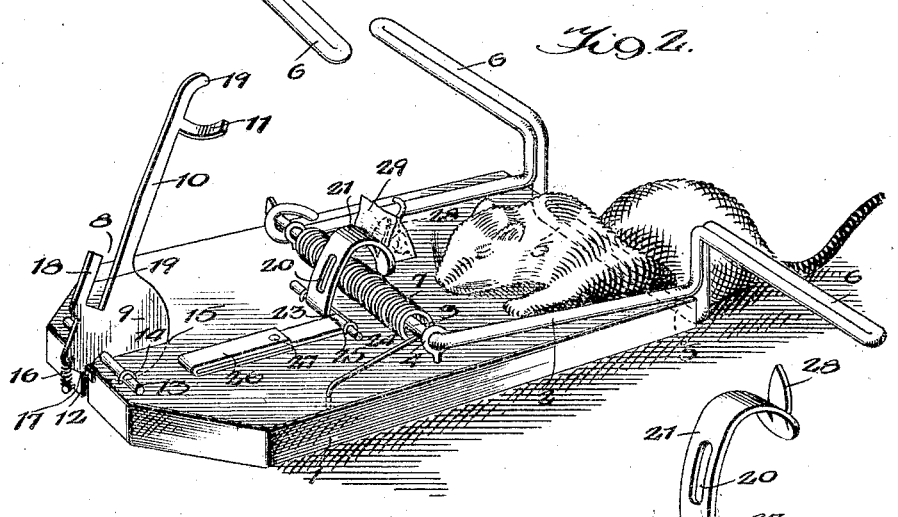
Figure 3:
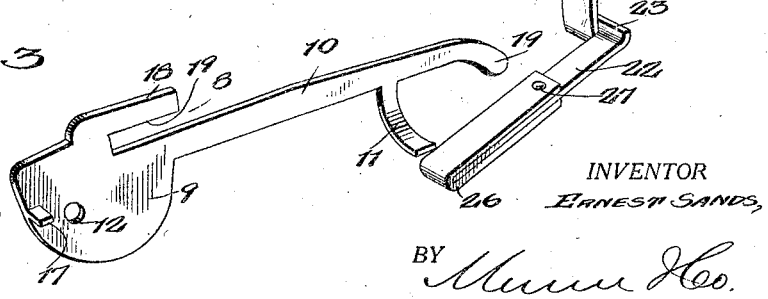

Figure 1 is a perspective view of the improved trap, showing the same "set" for operation, Figure 2 is a perspective view showing the trap with the jaw thereof sprung, and Figure 3 is a perspective group view showing the improved combined jaw-retaining and trigger member and the improved bait carrier which are comprised in the trap.

In carrying out the invention, in the form now preferred by me, I make use of a base 1 upon which is pivotally mounted a jaw 2. As in the case of the trap which is disclosed in my aforesaid application, the jaw 2 is substantially U-shaped and is formed of a single length of wire, one end portion of which is bent at right angles to provide a pivot element 3 which extends transversely of the base 1 intermediate the length of the latter and is held against displacement from the base by means of screw-eyes 4 or like fastening elements, through which the pivot element 3 extends. The bight portion of the jaw is offset slightly from the plane of the side members of the jaw, as indicated at 5, and the wire from which the jaw 2 is formed is bent in such manner that laterally extending handle portions 6 are provided to merge the bight portion 5 of the jaw into the side arms of the latter, the handle portion 6 lying in a plane which is offset from the plane of the side arms of the jaw and is located at the opposite side of the plane of said arms of the jaw from the plane of the bight portion 5.

The jaw 2 is urged continuously toward the position shown in Figure 2 by the usual torsion spring 7 which encircles the pivot element 3 and is arranged with one end thereof re-acting against the base while the other end re-acts against one side arm of the jaw member. When the jaw 2 is in "sprung" position, as illustrated in Figure 2, the bight portion 5 thereof will be disposed in contiguous relation to one end of the base 1 and below the plane of the upper face of the latter.

The jaw 2 may be releasably held in the position illustrated in Figure 1, in which position it is set for operation by means embodying the present invention and which will now be described.

Such means comprises a combined jaw-retaining and trigger member, indicated generally at 8, and best seen in Figure 3. The member 8 may be formed of a strip of suitable material, such as light gage metal, and is fashioned to provide a relatively wide end portion 9 and a narrower elongated arm 10 which lies in the plane of the portion 9 and is provided at an appreciable distance from its free end with a downwardly and outwardly curved extension 11 for a purpose to be hereinafter described. The portion 9 is provided with a transverse opening 12 through which extends a pivot pin 13. The latter is secured by staples 14 or like fastening devices upon the upper face of the base adjacent to one end of the latter so that the portion 9 will be partially received in a vertical slot 15 in the last-mentioned end of the base and the arm 10 will extend in overlying relation to the base substantially in the plane of the longitudinal median line of the base. A retractile spring 16, which is connected at one end with the portion 9 at the outer and upper corner of the latter and at its other end to the last-mentioned end of the base, tends to swing the member 8 upwardly and rearwardly. A lateral stop 17 integral with the portion 9 is adapted to engage with the base when the member 9 has been moved in response to the action of the spring 16 from the position shown in Figure 1 to the position shown in Figure 2 to prevent further upward and rearward swinging movement of the member 8.

The member 8 is provided with an upwardly offset finger-like extension 18 which is integral with the portion 9 of the member 8 and extends from its juncture with the latter in spaced parallel relation to the arm 10, whereby a slot 19' is defined between the finger 18 and the upper edge of the arm 10 for the reception of the bight portion of the jaw 2 when the latter has been swung to "set" position, as illustrated in Figure 1.

It will be manifest that the jaw 2 will be held in "set" position as illustrated in Figure 1 so long as the bight portion 5 is received in the slot 19' and is engaged by the finger 18. This condition will be obtained so long as the arm 10 is disposed in substantially parallel overlying relation to the upper face of the base 2, as illustrated in Figure 1. The arm 10, therefore, forms what may be considered the trigger portion of the member 8. The extremity thereof is bent downwardly in the plane thereof substantially along the arc of a circle, as indicated at 19, so that the upper edge of the extreme end portion 19 of the arm 10 will be convexly curved in the direction of its length. This extreme end portion of the arm 10 is adapted to enter a vertically elongated aperture 20 in a bait-carrying member 21 which is pivotally secured to the base 1 to swing about an axis parallel to the axis of the pivot element 3. The bait-carrying member 21 is one of a pair of furcations provided by slitting a substantially rectangular strip of light gage metal or like material longitudinally of the strip from one end nearly to the other end thereof. The second furcation of the strip is indicated at 22. These furcations are bent to extend substantially in right angular relation to each other and the one slitted end portion 23 of the strip at the juncture of the furcations 21 and 22 is bent upwardly and inwardly to co-operate with the furcations 21 in engaging with a pivot pin 24 which is secured upon the base 1 by staples 25 or like fastening devices in adjacent parallel relation to the pivot element 3. The furcation 21 then will be upstanding from the base and the furcation 22 rests flatwise upon the base and the furcations 21 and 22 will, of course, have rotational movement as a unit about the axis of the pivot pin 24. The furcation 22 constitutes a weight-carrying arm which has the free end thereof weighted in any suitable manner as by means of the U-shaped weight member 26 which is disposed in straddling relation to the free end portion of the arm 22 and is secured to the latter in any suitable known manner, as at 27. The arm 22 thus will be urged downward by gravity to rest flatwise upon the base 1. The furcation 21 constitutes the bait-carrying member, as hereinbefore stated and the upper end portion thereof is bent substantially into inverted U-shape and terminates at its free end in a vertical plane intersecting the base at the side of the pivot element 3 opposite the pivot element 24. In other words, the curved upper end portion of the bait-carrying member 21 extends transversely across the pivot element 3 in spaced overlying relation to the spring 7 so that the jaw 2 may be swung inwardly from the position shown in Figure 2 to the position shown in Figure 1 without coming in contact with the bait-carrying member. An upstanding tooth or prong 28 is struck from the curved upper end portion of the bait-carrying member 21 adjacent to the free end of the latter and is adapted to engage with a suitable bait to hold the latter upon the bait-carrying member.

From the foregoing description of the various parts of the device, the operation thereof may be readily understood. The weighted arm 22 is of sufficient weight to normally hold the bait-carrying member 21 in the position shown in Figures 1 and 2 irrespective of whether or not a bait, such as indicated at 29, is supported upon the bait-carrying member, it, of course, being understood that the bait 29 is not of unusual weight. When the jaw 2 is swung rearwardly from the position shown in Figure 2, the bight portion thereof will contact with the upper edge of the trigger arm 10 and will force the latter to swing downwardly about the axis of the pivot element 13 until the curved end portion 19 of the trigger arm has entered the vertically elongated opening 20 of the bait-carrying member 21 and the body of the trigger arm 10 is engaged at its juncture with the curved end portion 19 with the upper end wall of the aperture 20. At this time the bight portion 5 of the jaw will be positioned in the slot 19' and will be held because of its engagement with the finger 18 against upwardly swinging movement about the axis of the pivot element 3. The action of the weighted arm 22 on the bait-carrying member 21 tends to hold the latter in such position that the trigger 10 will be engaged by the upper end wall of the aperture 20 and the jaw 2 thus will be held in the position illustrated in Figure 1, in which position it is set for operation. However, only a slight downward pressure on the curved upper end portion of the bait-carrying member 21 is required to cause the latter to disengage the trigger 10, whereupon the latter will be swung upwardly in response to the action of the spring 16 and the jaw 2 will be released for movement to "sprung" position.

In the event that the weighted arm 22 should not be swung freely to the position shown in Figures 1 and 2, after the trap has been "sprung" for any cause, as because of friction between the bearing portion 23 and the pivot pin 24 or because of the weight of the baited member 21 being greater than that of the weighted arm 22, such weighted arm will be swung downwardly to the position shown in Figures 1 and 2 when the trap is "set" through the agency of the laterally turned striker member 11 on the trigger arm 10 which, on the downward movement of the trigger arm toward the position shown in Figure 1, will engage with the weighted arm 22 and push the latter downwardly to such position that the weighted arm 22 will over-balance the baited member 21. It will thus be manifest that the spring-pressed jaw 2 will be securely, although releasably, held in "set" position until the bait-carrying member 21 is actuated by some external force to move to position to release the trigger 10. The spring-pressed jaw 2 then will swing to a "sprung" position.

Obviously, my invention is susceptible of embodiment in forms other than that illustrated in the accompanying drawings and I, therefore, consider as my own all modifications and adaptations of the form of the device herein described which fairly fall within the scope of the appended claims.

What I claim is:—

1. A trap comprising a base, a spring-pressed pivoted jaw carried thereby, a pivoted member carried by the base and adapted to engage with said jaw to releasably hold the jaw in "set" position, said jaw engaging member having an integral elongated trigger portion, a pivoted bait carrier carried by said base, said bait carrier having an aperture formed therein for receiving the free end portion of said trigger when the bait carrier is in a certain position and the jaw-engaging member is engaged with said jaw, a weighted arm integral with said bait carrier and urged by gravity to position to hold said bait carrier in engagement with said trigger, and a lateral striker on said trigger adapted to engage said weighted arm just before the free end portion of said trigger enters the aperture in said bait carrier, said striker arm being adapted to force the weighted arm to position to hold said bait carrier in engagement with said trigger.

2. A trap comprising a base, a spring-pressed jaw carried thereby, a pivoted bait carrier upstanding from said base, said bait carrier having the upper end portion thereof bent to overlie the pivotal connection of said jaw with said base and to extend toward one end of the base, a weighted arm integral with said bait-carrier, said weighted arm and said bait carrier lying in planes diverging apart substantially at right angles and said weighted arm extending toward the second end of the base, said bait carrier having an opening formed therein intermediate the length thereof, a jaw-engaging member pivotally supported on the base adjacent to the second-named end of the latter for releasably holding the jaw in "set" position when in engagement with said jaw, said jaw-engaging member having an elongated trigger portion extending toward said bait carrier and adapted to enter and engage with the opening in the bait carrier when the latter is in normal position, said trigger portion having the extreme free end portion thereof curved downwardly and provided with a laterally extending striker arm adapted to engage with said weighted arm to force the latter toward position to hold said bait carrier in engagement with the end portion of said trigger.

3. A trap comprising a base, a spring-pressed pivoted jaw carried by the base, a bait carrier comprising one of a pair of furcations formed by slitting a strip of light gage material longitudinally from one end of the strip adjacent to the other end thereof, said furcations lying in planes diverging apart substantially at right angles and the unslitted portion of said strip being fashioned to provide a bearing, a pivoted element secured upon said base in adjacent parallel relation to the axis of the pivotal connection of said jaw and being secured to the base, whereby said bait carrier will be upstanding from said base, said second furcation being weighted and urged by gravity to position to rest flatwise upon said base, the upper portion of said bait carrier being bent laterally in the direction opposite said weighted furcation and being provided at the lower end of said laterally bent portion with an opening, a pivoted member carried by said base and adapted to engage with the bight portion of said jaw to releasably hold the latter in "set" position, said jaw-engaging member having an elongated trigger portion curved downwardly at its extremity, and adapted when in jaw-engaging position to extend into said opening in the bait carrier and to engage with the upper end wall of the latter at the inner end of said downwardly curved end portion of the trigger.

ERNEST SANDS.